United States Patent [19]

Tsai et al.

[11] Patent Number: 5,456,890
[45] Date of Patent: Oct. 10, 1995

[54] COMBINED ELECTRICALLY HEATABLE AND LIGHT-OFF CONVERTER

[75] Inventors: Peter R. F. Tsai, Columbia, Md.; William A. Whittenberger, Hiram, Ohio

[73] Assignee: W. R. Grace & Co.-Conn., New York, N.Y.

[21] Appl. No.: 164,039

[22] Filed: Dec. 9, 1993

[51] Int. Cl.$^6$ ........................................... F01N 3/10
[52] U.S. Cl. ................ 422/174; 422/180; 422/199; 502/439; 502/527; 60/300
[58] Field of Search .................... 422/174, 180, 422/199; 60/300; 502/439, 527

[56] References Cited

U.S. PATENT DOCUMENTS

| | | | |
|---|---|---|---|
| 5,140,813 | 8/1992 | Whittenberger | 422/180 |
| 5,146,743 | 9/1992 | Maus et al. | 422/174 |
| 5,149,508 | 9/1992 | Bullock | 422/174 |
| 5,272,876 | 12/1993 | Sheller | 422/174 |

FOREIGN PATENT DOCUMENTS 4102890  8/1992  Germany.

Primary Examiner—Robert J. Warden
Assistant Examiner—Hien Tran
Attorney, Agent, or Firm—Beverly J. Artale

[57] ABSTRACT

There is provided an electrically heatable converter body including a multicellular metallic honeycomb characterized by a plurality of first thin metal strips and a plurality of second thin metal strips in layered alternating relation, and wherein the first thin metal strips have a leading edge portion and a trailing edge portion, the leading edge portion of the first thin metal strips being longer than the trailing edge of said first thin metal strips.

31 Claims, 9 Drawing Sheets

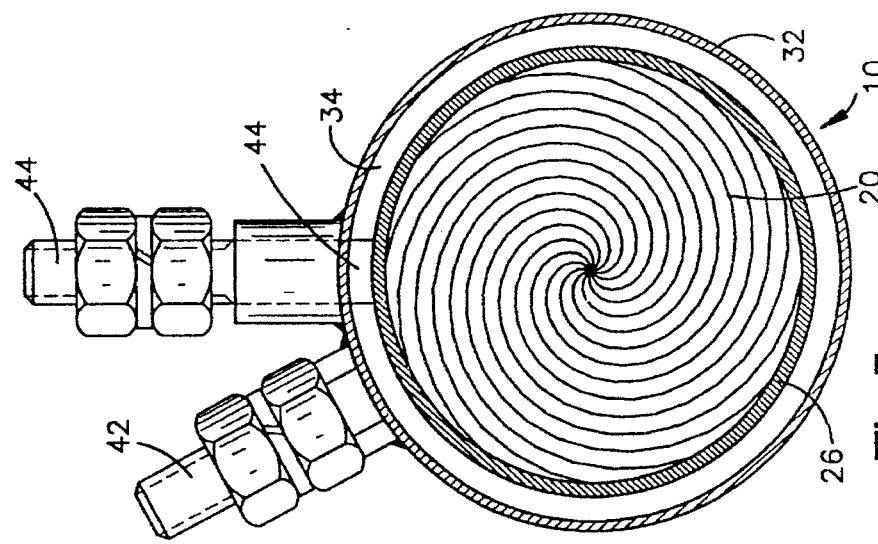
Fig. 5
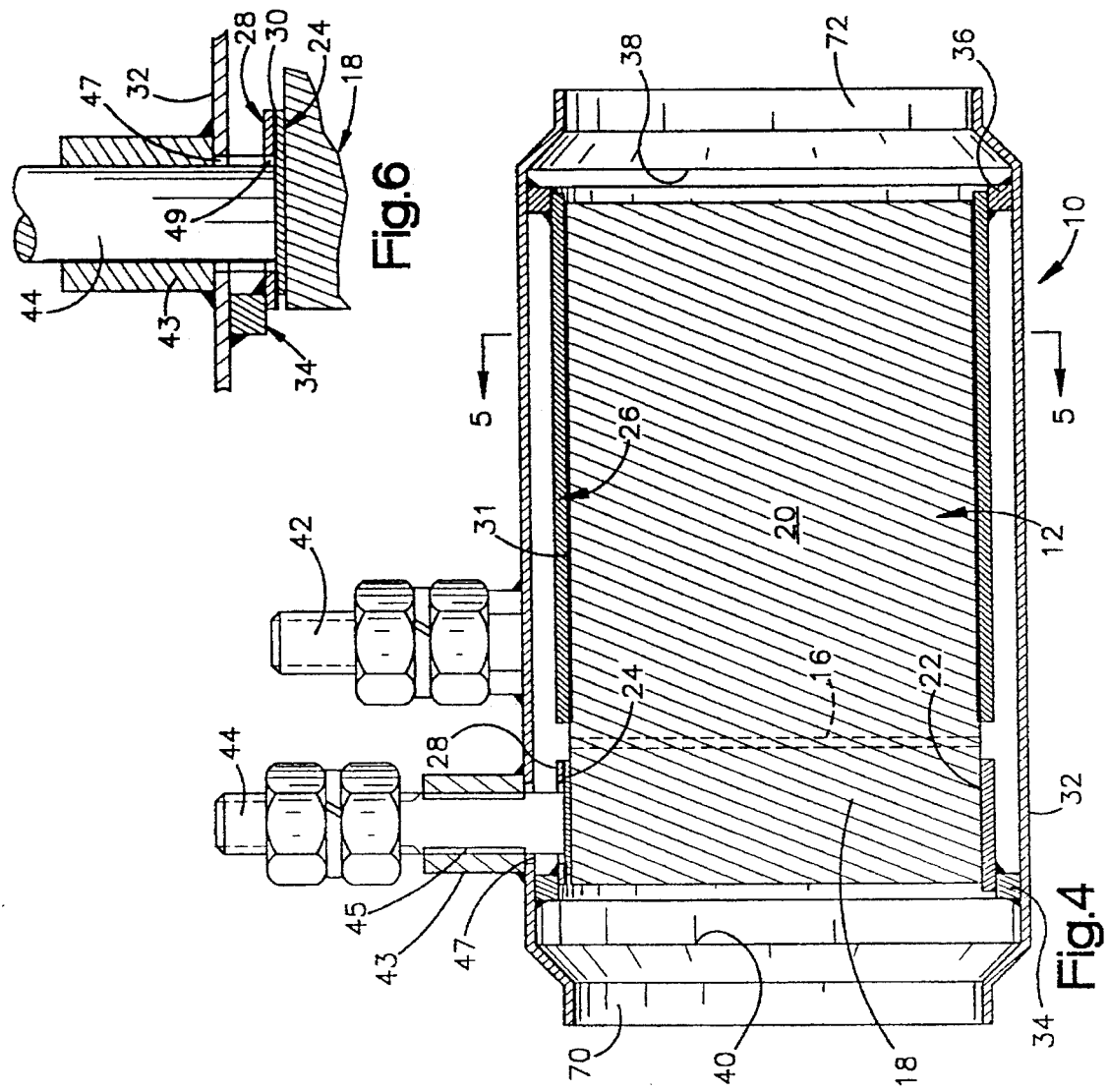
Fig. 6
Fig. 4

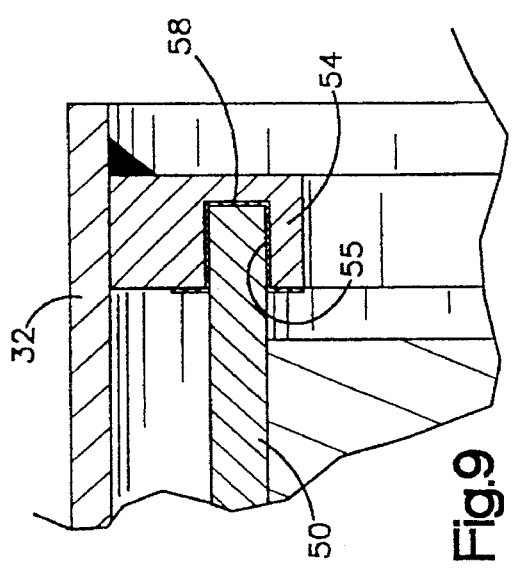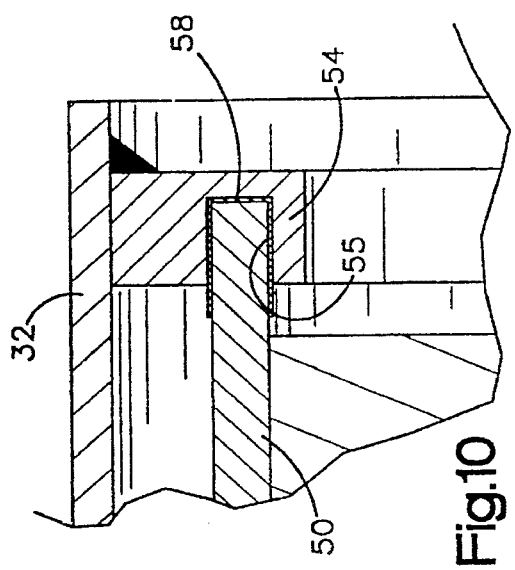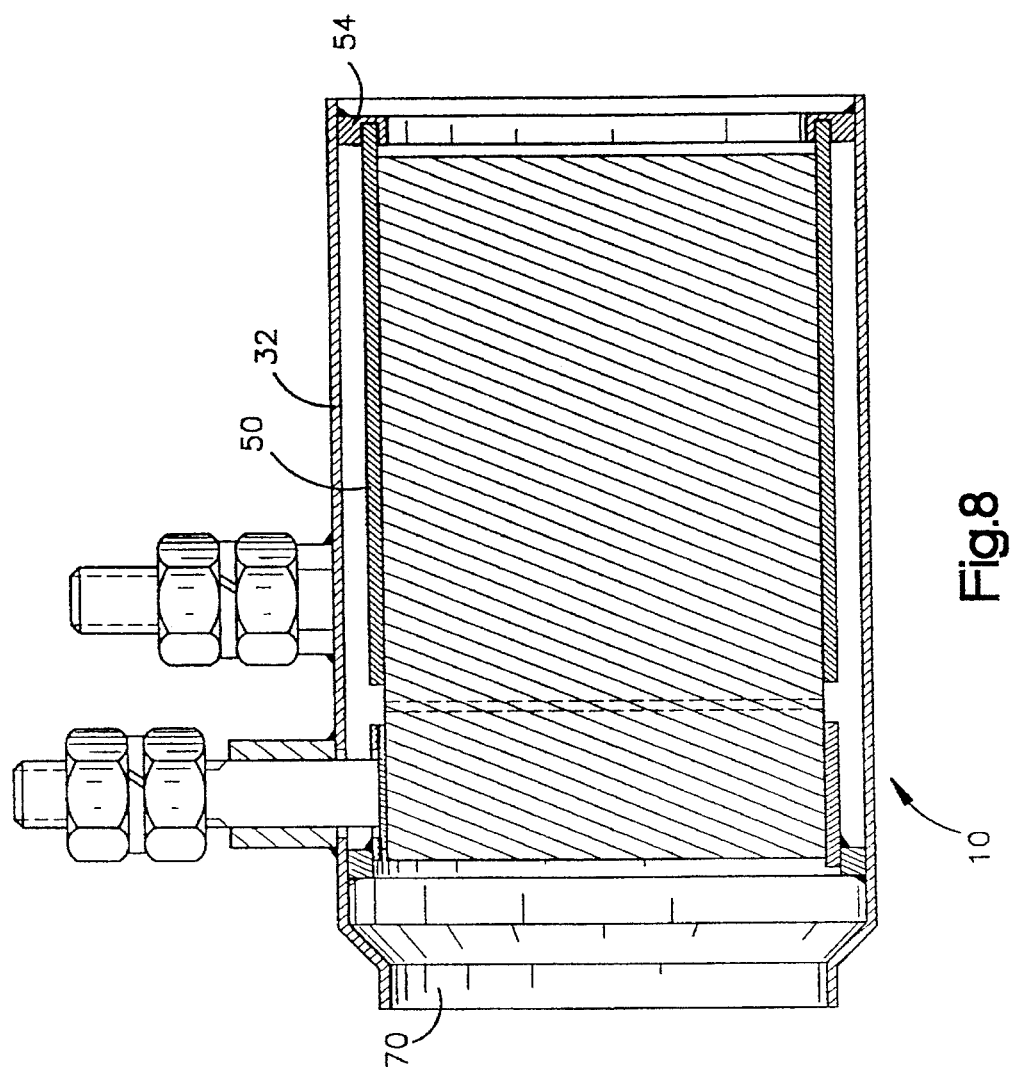

5,456,890

COMBINED ELECTRICALLY HEATABLE AND LIGHT-OFF CONVERTER

This invention relates to a combined electrically heatable converter portion and a "light-off" converter portion in a single outer housing. It is characterized by a thin metal core element which has a unique shape, i.e, one in which the leading or upstream edge is longer than the trailing or downstream edge. The core element, which is heated electrically, is desirably not grounded at the trailing edge, which improves power utilization. This invention is useful in carrying out chemical reactions, e.g. oxidation or reduction, especially those which utilize a catalyst. A "light-off" converter portion is one in which reaction, e.g., oxidation, is at least begun, the fluid passing therethrough having been preheated in the electrically heatable converter portion to the temperature at which reaction is initiated and wherein the reaction carried out at least partially to completion. In a specific adaptation of this device in an internal combustion engine exhaust line, the combined electrically heatable converter portion and "light-off" converter portion is followed, usually downstream, by a conventional converter, e.g., a ceramic core catalytic converter, wherein the reaction is carried to near completion.

BACKGROUND OF THE INVENTION AND PRIOR ART

This invention is related to that described and claimed in copending, commonly owned application Ser. No. 08/066,887 filed 25 May 1993 by Whittenberger and entitled "Combined Electrically Heatable Converter Body", the disclosure of which application is incorporated herein by reference thereto. The invention will be described in connection with embodiments especially adapted for use in exhaust lines from various types of engines, e.g., internal combustion engines of the spark ignited or compression ignited types, stationary or mobile, or gas turbine engines. It will be understood, however, that the converters of the present invention may be used to effect various chemical reactions, particularly those occurring in fluid streams, especially gas streams, which reactions are catalyzed or uncatalyzed.

Turning now to converters especially useful in exhaust lines extending from internal combustion engines, e.g., those used in automotive vehicles, the purpose of such catalytic converters is to convert pollutant materials present in the exhaust stream, e.g., carbon monoxide, unburned hydrocarbons, nitrogen oxides, ozone, etc., to carbon dioxide, nitrogen and water prior to discharge into the atmosphere. Conventional automotive catalytic converters utilize an oval or circular cross-section ceramic honeycomb monolith having square or triangular straight-through openings or cells, with catalyst deposited on the walls of the cells; catalyst coated refractory metal oxide beads; or corrugated thin metal foil, multicelled honeycomb monolith, having a refractory metal oxide coating and a catalyst carried on said coating and supported on the surfaces of the cells. The catalyst is normally a noble metal, e.g., platinum, palladium, rhodium, ruthenium, or a mixture of two or more of such metals. Zeolite coatings may also be used for the adsorption and desorption of pollutants to aid in their removal. The catalyst catalyzes a chemical reaction, mainly oxidation, whereby the pollutant is converted to a harmless by-product which passes through the exhaust system to the atmosphere.

However, conversion to such harmless by-products is not efficient initially when the exhaust gases are relatively cold, e.g., at cold engine start. To be effective at high conversion rate, the catalyst and the surface of the converter which the exhaust gases contact must be at or above a minimum temperature, e.g., 390° F. for carbon monoxide, 570° F. for volatile organic compounds (VOC) and about 900° F. for methane or natural gas. Otherwise, conversion to harmless by-products is poor and cold start pollution of the atmosphere is high. It has been estimated that as much as 80% of the atmospheric pollution caused by vehicles, even though equipped with conventional non-electrically heated catalytic converters, occurs in the first two minutes of operation of the engine from cold start. Once the exhaust system has reached its normal operating temperature, a non-electrically heated catalytic converter is optimally effective. Hence, it is necessary for the relatively cold exhaust gases to make contact with hot catalyst so as to effect satisfactory conversion. Compression ignited engines, spark ignited engines, reactors in gas turbines, small bore engines, such as used in lawn mowers, trimmers, boat engines and the like have this need.

To achieve initial heating of the catalyst at engine start-up, there is conveniently provided an electrically heatable catalytic converter unit, preferably one formed of a thin metal honeycomb monolith. This monolith may be formed of spaced flat thin metal strips, straight,through corrugated thin metal strips, pattern corrugated thin metal strips, e.g., herringbone or chevron corrugated thin metal strips, or variable pitch corrugated thin metal strips (such as disclosed in U.S. Pat. No. 4,810,588 dated 7 Mar. 1989 to Bullock et al) or a combination thereof. This monolith is connected to a 12 volt to 108 volt or higher, AC or DC supply, single or multiphase, preferably at the time of engine start-up and afterwards to elevate the catalyst to and maintain the catalyst at at least 650° F. plus or minus 30° F. Alternatively, power may also be supplied for a few seconds prior to engine start-up.

Catalytic converters containing a corrugated thin metal (stainless steel) monolith have been known since at least the early 1970's. See Kitzner U.S. Pat. Nos. 3,768,982 and 3,770,389 each dated 30 Oct. 1973. More recently corrugated thin metal monoliths have been disclosed in U.S. Pat. No. 4,711,009 dated 8 Dec. 1987 to Cornelison et al; U.S. Pat. Nos. 4,152,302 dated 1 May 1979, 4,273,681 dated 16 Jun. 1981, 4,282,186 dated 4 Aug. 1981, 4,381,590 dated 3 May 1983, 4,400,860 dated 30 Aug. 1983, 4,519,120 dated 28 May 1985, 4,521,947 dated 11 Jun. 1985, 4,647,435 dated 3 Mar. 1987, 4,665,051 dated 12 May 1987 all to Nonnenmann alone or with another; U.S. Pat. No. 5,070,694 dated 10 Dec. 1991 to Whittenberger; International PCT Publication Numbers WO 89/10470 (EP412,086) and WO 89/10471 (EP 412,103) each filed 2 Nov. 1989, claiming a priority date of 25 Apr. 1988. The above International Publication numbers disclose methods and apparatus for increasing the internal resistance of the device by placing spaced discs in series, or electrically insulating intermediate layers. Another International PCT Publication is WO 90/12951 published 9 Apr. 1990 and claiming a priority date of 21 Apr. 1989, which seeks to improve axial strength by form locking layers of insulated plates. Another reference which seeks to improve axial strength is U.S. Pat. No. 5,055,275 dated 8 Oct. 1991 to Kannanian et al. Reference may also be had to International PCT Publication Number WO 92/13636 filed 29 Jan. 1992 claiming a priority date of 31 Jan. 1991. This application relates to a honeycomb body along an axis of which fluid can flow through a plurality of channels. The honeycomb has at least two discs in spaced relation to each other. According to the specification, there is at least one bar type support near the axis by which the discs are connected together and mutually supported. The invention is said to make possible design of the first disc for fast heating up through exhaust gas passing through or applied electrical current. The honeycomb body serves as a support for catalyst in the exhaust system of an internal combustion engine. Another reference is German Patent Application Number 4,102,890 A1 filed 31 Jan. 1991 and published 6 Aug. 1992. This application discloses a spirally wound corrugated and flat strip combination wherein the flat strip contains slots and perforations and is electrically heatable. The flat strips include a bridge between leading and trailing edge portions. Groups of such strips are separated by insulation means. The core is provided with a pair of circular retainer segments which are separated by insulation means. No end tabs are provided and the flat strip portions are integral. Another reference is U.S. Pat. No. 5,102,743 dated 7 Apr. 1992 to Maus et al. This patent discloses a honeycomb catalyst carrier body of round, oval or elliptical cross-section including a jacket tube, and a stack of at least partially structured sheet-metal layers intertwined in different directions in the jacket tube. The stack has a given length and a given width. At least one of the sheet metal layers has a greater thickness over at least part of one of the dimensions than others of the layers. Such at least one layer is formed of thicker metal or of a plurality of identically structured metal sheets in contiguous relation.

A common problem with prior devices has been their inability to survive severe automotive industry durability tests which are known as the Hot Shake Test and the Hot Cycling Test.

The Hot Shake Test involves oscillating (100 to 200 Hertz and 28 to 60 G inertial loading) the device in a vertical attitude at a high temperature (between 800° and 950° C.; 1472° to 1742° F., respectively) with exhaust gas from a running internal combustion engine simultaneously passing through the device. If the core of the catalytic device telescopes or displays separation of folding over of the leading or upstream edges of the foil leaves up to a predetermined time, e.g., 5 to 200 hours, the device is said to fail the test. Usually a device that lasts 5 hours will last 200 hours. Five hours is equivalent to 1.8 million cycles at 100 Hertz.

The Hot Cycling Test is performed with exhaust gas flowing at 800° to 950° C.; (1472° to 1742° F., respectively) and cycled to 120° to 150° C. once every 15 to 20 minutes for 300 hours. Telescoping of the core, or separation of the leading edges of the thin metal foil strips is considered a failure.

The Hot Shake Test and the Hot Cycling Test are hereinafter called "Hot Tests" and have proved very difficult to survive. Many efforts to provide a successful device have been either too costly or ineffective for a variety of reasons.

The structures of the present invention will survive these Hot Tests.

Early embodiments of electrically heatable catalytic converters were relatively large, especially in an axial direction, e.g., 7 to 10 or more inches long and up to 4.5 inches in diameter. These were inserted into an exhaust system as a replacement for the conventional catalytic converter now in common use, or in tandem relation with such conventional catalytic converter in the exhaust line. It was then found that an axially thin or "pancake" electrically heatable corrugated thin metal honeycomb monolith could be used in close tandem relation with the conventional catalytic converter.

It was later found that even better performance resulted from a "cascade" of converters, a low thermal inertia electrically heatable converter (EHC), followed by a medium thermal inertia converter, followed by a large thermal inertai main converter, all on the same axis of gas flow. Each converter had not only a different thermal inertia, but also a different geometrical cross-sectional area, or a different geometrical configuration, e.g., small circular, larger oval, to the final oval size and shape of a conventional unheated converter. This solution provided for fast, economical heating of the EHC. Heat generated from an oxidation reaction initiated in the EHC then heated the intermediate or "light-off" converter which in turn heated the large conventional catalytic converter.

It should be noted that the electrically heatable honeycomb acts to preheat the exhaust gas to its "light-off" temperature where, in the presence of catalyst, the pollutants are converted. Some conversion occurs in the electrically heatable device, and most Of the conversion occurs in the final catalytic converter section which is not normally electrically heated.

It has recently been found that a "pancake" electrically heatable device and a conventional multicellular metal monolith catalytic converter may be positioned together within a common housing to take advantage of the common diameter and/or geometric configuration (e.g., circular, oval or elliptical) in a cascading device, and having a shorter axial length than required in either a tandem relation or the prior cascade relation. These prior devices provide three units of differing thermal inertia. However, instead of a three-structural member cascade device, the improved structure enabled a two member cascade device. Reference may be had to the copending, commonly owned patent application of William a Whittenberger and Edward T. Woodruff entitled "Core Element Useful in a Combined Electrically Heatable and Light-Off Converter" filed 3 Feb. 1993 and given Ser. No. 08/013,516; and to copending, commonly owned patent application Ser. No. 08/066,887 filed 25 May 1993 by William A. Whittenberger entitled "Combined Electrically Heatable Converter Body."

The present invention is an improvement on the cascade devices of the preceding applications in that it enables easier manufacture and enables formation of both the electrically heatable portion and the light-off portion to be encased in a single housing. Instead of the back end, or trailing edge portion of the foil being allowed to "float" electrically, the back end of the foils of this invention are not grounded, and hence there is no opportunity for shorting out. Longer heating portions in the leading edge portion increase the resistance of the heating strip. It is also possible with the devices hereof to provide localized heating patterns as will be explained below. The dual purpose devices hereof may be backed up with a conventional catalytic converter of, for example, the commonly used ceramic type, the alumina pellet type, or the thin metal monolith honeycomb type. Each portion has a different thermal inertia, the electrically heatable portion being the lowest of the three. Thus, the advantages of the cascade effect for successive light-off may be utilized without encountering a number of the problems associated therewith. Avoiding substantial electrical heating of a major portion of the thin metal honeycomb effects a major saving in electrical power required. The devices hereof may be thought of as "integral" in that all of the thin sheet metal layers have the same axial length albeit different circumferential lengths, thereby providing improved durability in, for example, the Hot Tests.

In the following description reference will be made to "ferritic" stainless steel. A suitable ferritic stainless steel for use particularly in the engine exhaust applications hereof, is described in U.S. Pat. No. 4,414,023 dated 8 Nov. 1983 to Aggen. A specific ferritic stainless steel alloy useful herein contains 20% chromium, 5% aluminum, and from 0.002% to 0.05% of at least one rare earth metal selected from cerium, lanthanum, neodymium, yttrium, and praseodymium, or a mixture of two or more of such rare earth metals, balance iron and trace steel making impurities. A ferritic stainless steel of the foregoing analysis is commercially available from Alleghney Ludlum Steel Co. under the trademark "Alfa IV."

Another metal alloy especially useful herein is identified as Haynes 214 alloy which is also commercially available. This alloy and other nickeliferous alloys are described in U.S. Pat. No. 4,671,931 dated 9 June 1987 to Herchenroeder et al. These alloys are characterized by high resistance to oxidation. A specific example of an alloy useful herein contains 75% nickel, 16% chromium, 4.5% aluminum, 3% iron, optionally trace amounts of one or more rare earth metals except yttrium, 0.05% carbon and steel making impurities. Haynes 230 alloy, also useful herein, has a composition containing 22% chromium, 14% tungsten, 2% molybdenum, 0.10% carbon, and a trace amount of lanthanum, balance nickel. The ferritic stainless steel, and the Haynes alloys 214 and 230 are examples of high temperature resistive, Oxidation resistant (or corrosion resistant) metal alloys that are suitable for use in making thin metal strips for use in the converter bodies hereof, and particularly for making integral heater strips for the EHC portions. Suitable metals must be able to withstand "high" temperatures of 900° C. to 1200° C. (1652° to 2012° F.) over prolonged periods.

Other high temperature resistive, oxidation resistant metal alloys are known and may be used herein. For most applications, and particularly automotive applications, these alloys are used as "thin" metal strips, that is, having a thickness of from about 0.001" to about 0.005", and preferably from 0.0015" to about 0.003".

The features of the converters of the present invention are also advantageous in low temperature catalyzed applications, e.g., below zero Centigrade to room temperature and up to 500° F. using metals such as copper, ordinary steels, zinc, silver, tin, chromium, aluminum, nickel, titanium, magnesium, molybdenum, etc. to form the thin metal foil strips hereof. In such applications heat may be abstracted from the foil strips instead of added. However, the generally more expensive high temperature resistive, oxidation resistant alloys may be used in such lower temperature applications if desired.

In the following description, reference may also be made to fibrous ceramic mat, woven ceramic tape, or fabrics, or insulation. Reference may be had to U.S. Pat. No. 3,795,524 dated 5 Mar. 1974 to Sowman, and to U.S. Pat. No. 3,916,057 dated 28 Oct. 1975 to Hatch, for formulations and manufacture of fibers useful in making tapes and mats which may be used herein. One such woven ceramic fiber material is currently available from 3-M Co. under the trademark "NEXTEL" 312 Woven Tape and is useful for insulation of thin metal strips or groups thereof. Ceramic fiber mat is commercially available also from 3-M Co. under the trademark "INTERAM". For most purposes, a coating insulation layer on the surface of the strips, for example and as later described, is preferred.

BRIEF STATEMENT OF THE INVENTION

Briefly stated, the present invention is a metallic electrically heatable converter body comprising a sheet metal tubular housing axially divided into a plurality of electrically isolated segments, and a cellular metallic honeycomb contained therein, said honeycomb comprising a plurality of first thin metal layers and a plurality of second thin metal layers, said first and second layers being in alternating relation, said first thin metal layers having at leading edge portion and a trailing edge portion, the leading edge portion of said first thin metal layers being longer than the trailing edge. In more specific aspects, the second thin metal strips have a leading edge portion and a trailing edge portion, the leading edge portion being shorter than the trailing edge portion. For most purposes, the first thin metal strips are flat thin metal strips. The second thin metal strips may desirably be corrugated thin metal strips. The leading edge of the first thin metal strips which is longer than the trailing edge is up to 2 inches longer, and is usually, albeit not necessarily, centered on the leading edge, i.e., with a 1 inch overhang on each end.

BRIEF DESCRIPTION OF THE DRAWINGS

The invention may be better understood by having reference to the annexed drawings showing a preferred embodiment of the invention and included modifications thereof equivalent to the preferred embodiment, and wherein:

FIG. 4 is a longitudinal cross-sectional view of an assembled electrically heatable converter body in accordance with this invention showing the core, the concentrically disposed inner and outer housings, and the electrical terminal and thermocouple terminal, and showing the heated section, and the light-off section.

FIG. 5 is an end view of a converter in accordance herewith fully assembled as it appears in the plane indicated by the line 5—5 in FIG. 4.

FIG. 6 is a detail view of the attachment end of an electrical terminal to the spirally wound core.

FIG. 8 is a longitudinal cross-sectional view of an electrically heatable converter body in accordance with this invention showing a core, the concentrically disposed inner and outer housings, the electrical terminal, the thermocouple terminal, and showing the heated section and the light-off section.

FIG. 9 is a detail view of the downstream end of the converter body of FIG. 8.

FIG. 10 is a detail of another form of downstream end treatment of the converter body of FIG. 8.

DETAILED DESCRIPTION OF THE DRAWINGS

As indicated above, the present invention is an improvement on prior "integral" structures of converter bodies wherein an electrically heatable portion is contained in the same housing as the "light-off" portion. While both portions have the same cross-sectional geometrical configuration, they, nevertheless, have different thermal inertias, and the desired "cascade" effect is preserved. Thus, the devices hereof are "integral," in that they have both the electrically heatable portion and the "light-off" portion in the same housing. A characterizing difference from prior structures is that some of the thin metal strips have elongated leading edges wherein the leading edges are longer than the trailing edges of said strips. The "leading edge" of a thin metal strip is the first edge of the strip that contacts incoming exhaust gas, and the "trailing edge" of the thin metal strip is the last edge the exhaust gas contacts as it leaves the converter body. The devices hereof are further improved when, as they are in prior structures, the trailing edge portions are not grounded, and there is thus no current loss due to shorting between thin metal layers and the outer housing and power utilization is better. Moreover, the devices hereof have fewer parts than prior devices of a similar nature. Variations in heating patterns are also obtainable as will be discussed below.

Figure 1:
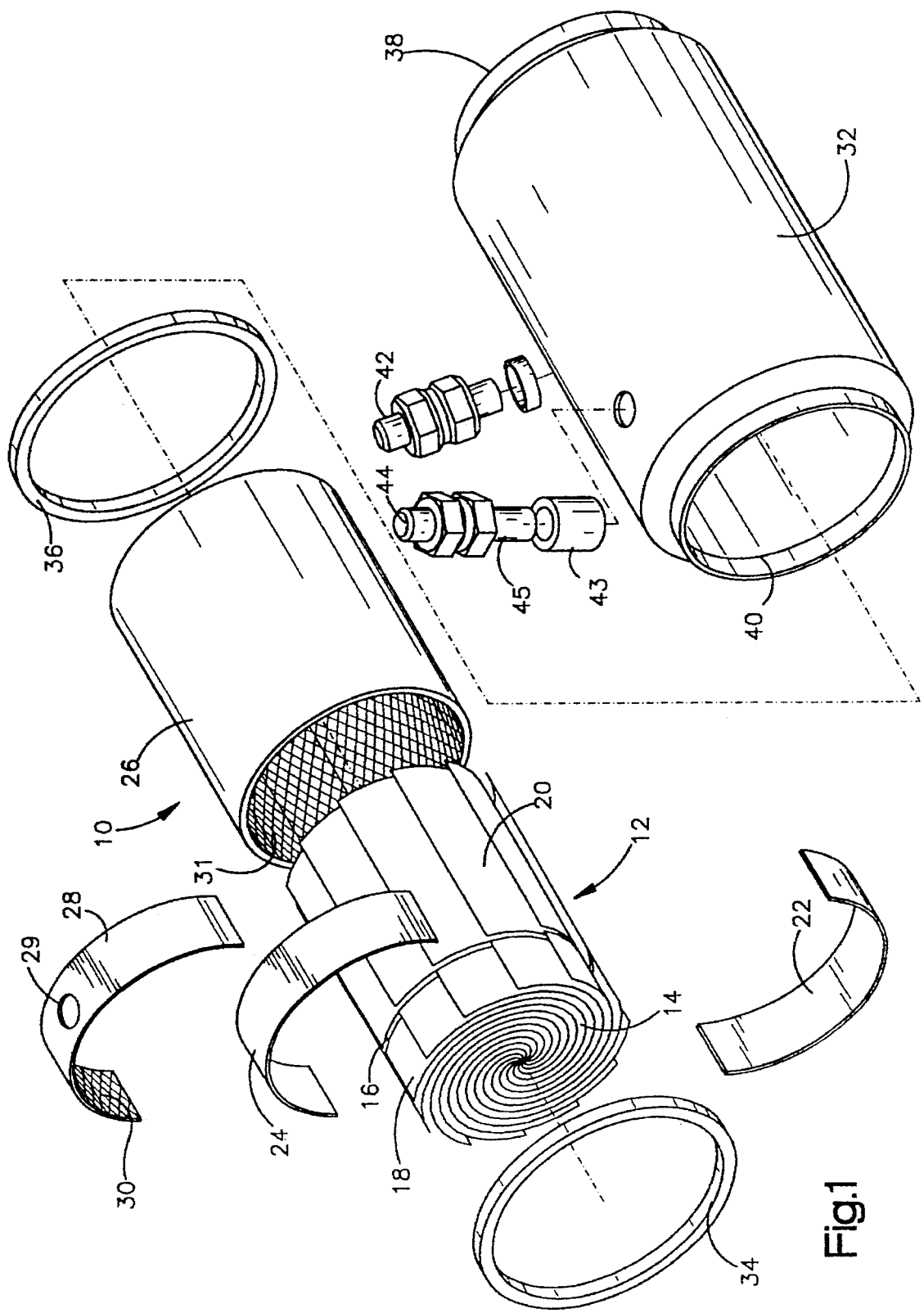
FIG. 1 is an exploded perspective view of a electrically heatable converter body in accordance with this invention showing, in diagrammatic form, a spirally wound core of alternating flat and corrugated thin metal strips, and showing the inner and outer housings or cans.

Referring now more particularly to the drawings, in FIG. 1 there is shown in exploded manner a converter body 10 in accordance herewith. The converter body 10 has as a principal component, a core 12 formed from a plurality of layered thin sheet metal strips alternating flat and corrugated as will be described later in connection with FIG. 8, and S-wound about a center. Reference may be had to copending, commonly owned U.S. patent application Ser. No. 08/84,426 filed 29 Jun. 1993 by David Thomas Sheller which shows a method for stacking the thin metal strips, and crushing the center portion of the stack and heating to fuse a brazing powder or paste disposed on the center portions of each strip. This forms a rigid central post about which the stack can be wound resulting in an S-winding. The winding as illustrated in the end 14 of the core 12 in FIG. 1. The line 16 in FIG. 1 denotes the split between the electrically heatable portion, or EHC 18, and the "light-off" portion 20. The core 12 is contained in a discontinuous inner housing composed of a first retainer portion 22, a second retainer portion 24, which together form a retainer for the EHC portion 18, and a final inner tubular portion 26 which serves as a retainer for the "light-off" portion 20. Were it not for the retainer portions 22, 24 and 26, the tightly wound core 12 would tend to unwind. Superimposed over the first retainer portion 24 is a semicircular member or half shell 28 having a insulative coating 30 of "dielectric" material on the inner surface which is in contact with the upper surface of the retainer portion 24. The inner surface of the inner retainer housing or can 26 is provided with a "dielectric" coating 31 for insulating the "light-off" portion of the core from the outer housing 32 and ground potential.

To digress briefly, a typical procedure for applying a "dielectric" coating involves first coating the metal surface with a single coating of gamma-alumina slurry at a loading of about 5 to 10 mg per square inch of surface, followed by drying, and then calcining at 700° to 1200° C. (1292° F. to 2192° F.) for at least about 10 seconds, to form a tightly bonded insulative coating. This is typically followed by from 1 to 6 or more coatings of gamma-alumina/ceria slurry, or washcoat, to a loading of about 30 to 40 mgs. per square inch, drying after each coat and then calcining at about 500° C. (930° F.). The usual coating with a refractory metal oxide produced at the lower temperature of 500° to 1200° F. also has insulating properties, but not to the same degree as the "dielectric" coating. The "dielectric" coating is believed to be a spinel and thus is of different chemical composition from the normal refractory metal oxide coating calcined at a lower temperature. To coat thicker parts, such as housings, retaining rings, etc., plasma spraying of gamma-alumina may be used. High temperature calcining may be used in this case, if desired.

Returning now to the discussion of FIG. 1, the assembly of the core 12 and the retainer portions 22, 24 and 26, and the half shell 28 is inserted into an outer housing 32 into which it is held and sealed by front, or upstream, sealing ring 34, and a second, downstream sealing and holding ring 36. The ends 38 and 40 of the outer housing 32 extend slightly, e.g., 1/16 to 1/2" beyond the core assembly. End cap adapters, which are known (not shown) for adapting the converter body for insertion in a conventional exhaust line are attached to the ends of the outer housing 32. A thermocouple feed-through 42 and a terminal stud 44 are attached to the outer housing 32 through a sleeve or collar 43 in a known manner, the stud 44 being stud welded, for example, to the retainer shell portion 24 through a hole 29 in the half shell 28. There is no "dielectric" coating on the inner or concave surface of the retainer portion 24, or the retainer portion 22.

Figure 2:
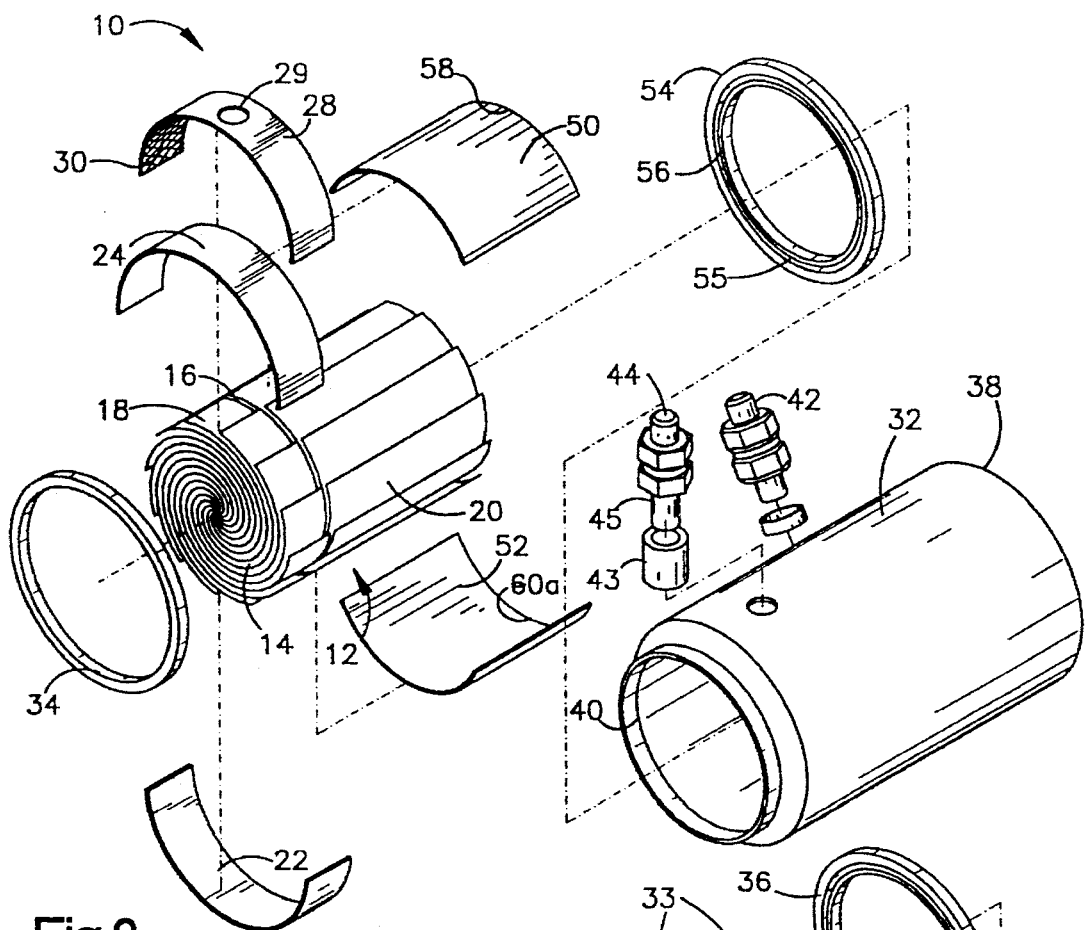
FIG. 2 is another exploded perspective view of an electrically heatable converter body in accordance with this invention showing, in diagrammatic form, also a spirally wound core of alternating flat and corrugated thin metal strips, and showing a split inner housing and a circular outer housing.

FIG. 2 is a preferred embodiment of the converter body of this invention and represents the best mode presently known of practicing the invention.

In FIG. 2, there is shown a device similar to that shown in FIG. 1. Corresponding parts have corresponding numbers and corresponding descriptions. The only parts which do not correspond to similar parts in FIG. 1 are the inner housing and the aft sealing and mounting ring. The inner housing is composed of two half shells, 50 and 52, which may be seam welded in place and serve to retain the tightly wound core against unwinding. Alternatively, the half shells 50 and 52 may be held by the mounting ring 54. The aft sealing and mounting ring 54 is provided with a circular notch 55 which in turn is provided with a "dielectric" coating 56 (See FIG. 9). It is into this notch 55 that the ends 58 and 60a are inserted to hold the core assembly in spaced, insulated relation to the outer housing 32. Instead of coating the notch 54 with a "dielectric" coating, the notch 54 may be left uncoated and the ends 58 and 60a of the half shells 50 and 52 coated with "dielectric" insulative coating. The "dielectric" insulative Coating prevents grounding of the trailing edge portions and the accompanying current loss. The half shells 50 and 52 may be combined into a single peripheral shell unit and "dielectric" coated on the inside and/or the outside.

Figure 3:
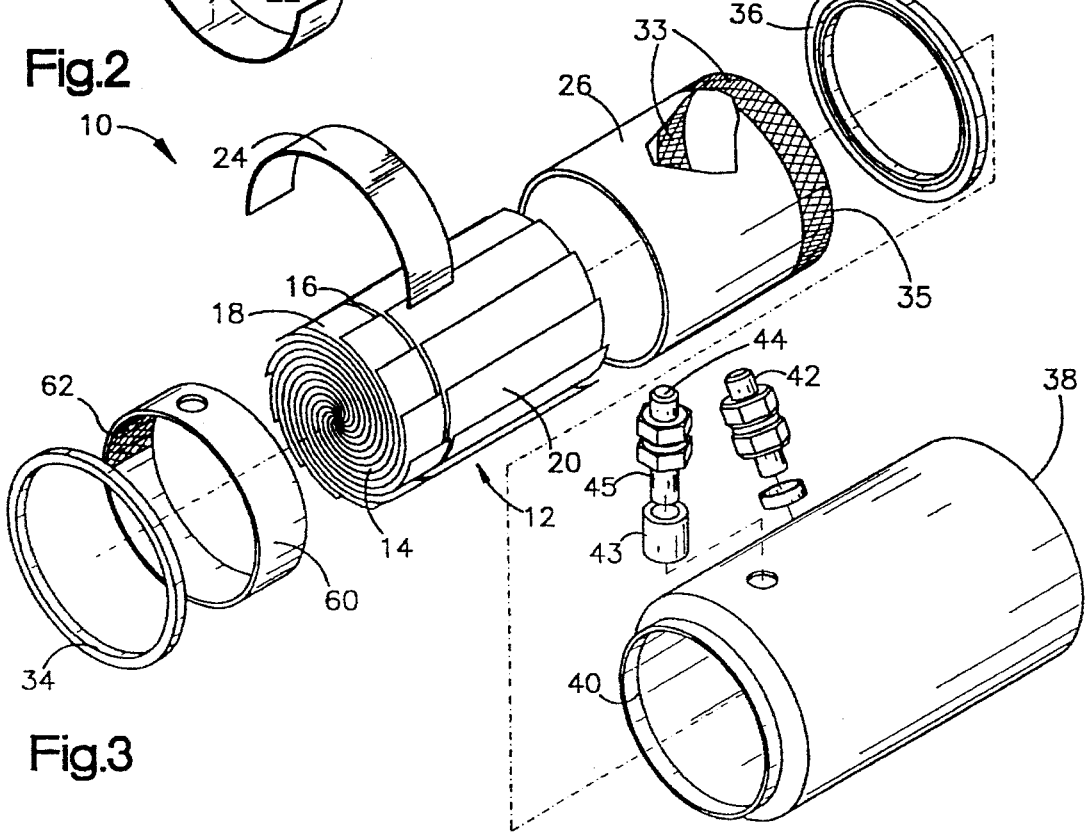
FIG. 3 is another exploded perspective view of an electrically heatable converter body in accordance with this invention showing, in diagrammatic form, also a S-wound core of alternating flat and corrugated thin metal strips, and showing another form of the device with a full ring on the front or exhaust gas receiving end, Which ring is coated on the upper half only with a "dielectric" coating, which will be explained below.

FIG. 3 is similar to FIG. 1. Corresponding parts have corresponding numbers and descriptions. The only part which does not correspond to a similar part in FIG. 1 is a circular metal shell 60 that surrounds the EHC portion and replaces parts 22 and 28 of FIG. 1. The top inner half 62 of the shell 60 is coated with a "dielectric" coating to insulate the shell. The terminal stud 44 is stud welded to the metal half shell 24 and provides current to the lower half of the wound core 12. The balance of the core, comprising the opposite ends of the core elements (hereinafter described) are at a negative potential being indirectly connected to the automobile chassis which is commonly at a negative potential or ground potential. The can 26, is coated on the end 35 inside and/or outside 33 with a "dielectric" coating.

Figure 7:
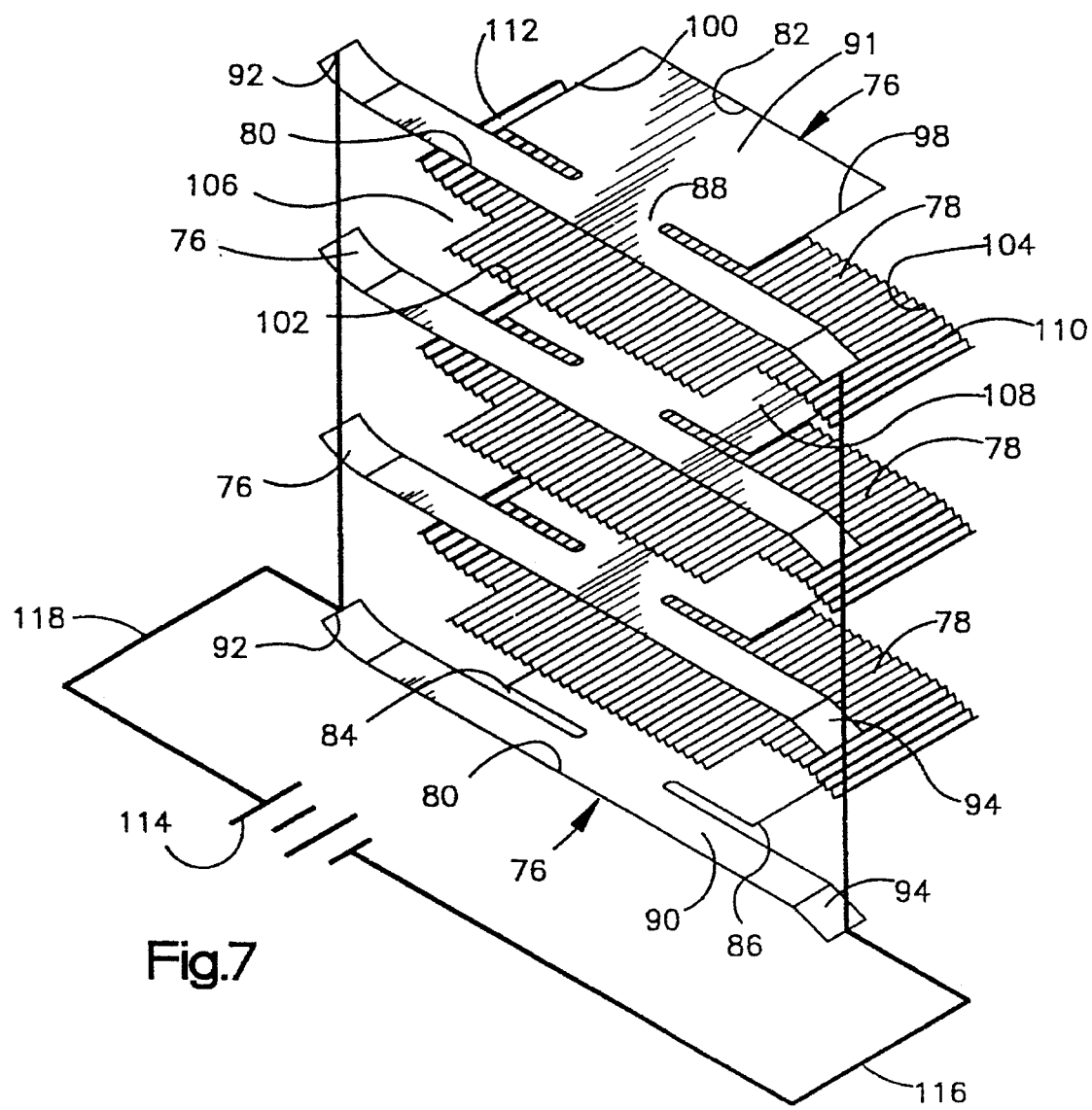
FIG. 7 is a perspective exploded view of a stack of thin metal strips, alternating flat and corrugated, prior to winding, and showing the extended leading edges of the flat strips, and the shorter, notched leading edges of the corrugated strips.

Tests have shown that in the electrically heatable foil portions all of the current passes through the leading edge portion and is used for heating, whereas there is no detectable current flow or loss through the trailing edge portion even though the leading edge portion and the trailing edge portion are joined together by a bridge (see the bridge 88 in FIG. 7).

FIG. 4 shows a cross-sectional side view of a fully assembled converter body 10 hereof. The parts correspond to the parts shown in FIG. 1 and have corresponding numbers. Horizontal lines indicating the foil layers have been omitted in FIG. 4 for clarity. In FIG. 4, additional parts shown are end caps 70 and 72 which adapt the converter body 10 to be inserted into an exhaust line (not shown). The terminal stud 44 has a thin plasma spray applied ceramic ( e.g., alumina) coating 45 to insulate the terminal 44 from the collar 43 and the outer housing 32. There are also provided gaps 47 and 29 in the outer housing 32 and the first retaining shell 24, so that the terminal, stud 44 does not short out with the housing 32 and the half shell 28, and instead directs the current to the first retaining shell portion 24 (FIG. 3).

FIG. 5 is a cross-sectional view of the core body 10 of FIG. 4 as it appears in the plane indicated by the line 5—5 in FIG. 4. This view bet tar shows an offset angle of the thermocouple terminal 42.

FIG. 6 is a detail view on an enlarged scale which better shows the relationship of the terminal stud 44 and the electrically heatable portion 18, and its attachment thereto. Note that the front sealing ring 34 is welded to the outer housing 32 and to the half shell 28 on the top half, and to the bottom retaining shell portion 22. (FIG. 4) The gaps 47 and 29 are better shown in this FIG. 6.

FIG. 7 shows in exploded, developed, perspective manner a series of four flat thin metal strips 76 and three corrugated thin metal strips 78 in alternating, layered relation. The thin metal strips 76 and 78 are configured in accordance with this invention. These strips 76 and 78, may be of ferritic stainless steel, or Haynes 214 or 230, or any other metal suitable for use under the conditions of use of the converter body.

The flat thin metal strips 76 are conveniently coated on both sides with a washcoat of gamma-alumina applied as a "dielectric" coating, i.e., baked at a high temperature as described above. The flat thin metal strips 76 desirably have, what, for convenience, is called a generally "H" shape, the characterizing feature of which is that one leg of the "H" is substantially longer than the other, and the cross bar is relatively short. Thus, in FIG. 7, the flat thin metal strips 76 have a leading edge 80 and a trailing edge 82 indicating the order in which the exhaust gas traverses those edges in actual use. As is clearly shown in FIG. 7, the leading edge 80 of the flat strips 76 is longer than the trailing edge 82 of the flat strips 76. The leading edge 80 is one boundary of the leading edge portion 90 which is partially bounded by the notches 84 and 86 which both extend inwardly parallel to the leading edge 80 less than one half the entire length of the thin metal strip 76 and define between their inner extremities the bridge or cross bar 88. The ends 92 and 94 of the leading edge portion extend beyond the ends 98 and 100 of the flat thin metal strips 76 such that the projection of the lines defining the ends 98 and 100 would intersect the extensions of the ends 92 and 94 leaving from about 0.25" to about 1.0" overhang on each end.

The thin metal strips 78 are corrugated, the corrugations having an amplitude of from about 0.02" to about 0.1" and a pitch of from about 0.02" to about 0.15". The cross-section of the corrugation is desirably triangular with the apices rounded off to relieve stress, or sinusoidal. These corrugations are desirably straight-through corrugations, i.e., they run in a straight line generally normal to the leading and trailing edges. The corrugations may be skewed 5 to 10 degrees from normal, if desired. Thus, the corrugated thin metal strips 78 have a leading edge 102 and a trailing edge 104. In this case, however, the leading edge 102 is shorter than the trailing edge 104, made so by the notches 106 and 108 which prevent contact with the projecting ends 92 and 94 of the flat thin metal strips 76. In some embodiments, the notches 106 and 108 may be omitted, and the ends squared off.

It should be observed, as shown in FIG. 7 that the ends of the strips 76 and 78 are, respectively, slightly bent in opposite directions. Thus; the ends 92 are shown bent in an upward direction, and the ends 94 are shown bent in a downward direction. So it is also with the ends 110 and 112. The ends 92 and 112 are bent in the same direction, upwardly as shown, and the ends 94 and 110 are also bent in the same direction, downwardly as shown. Any wash coating or insulating coating on both sides of the bent ends must be removed in order that these ends may be conveniently Welded or brazed to the respective retaining shells. Alternatively, ceramic brazing may be used. This procedure is disclosed in U.S. Pat. No. 5,186,380.

The elongated leading portions 90 are electrically heatable whereas, the trailing portions 91 are not electrically heatable because of the configuration and the insulation from ground in practice. The corrugated thin metal strips 78 are not connected to any power source and thus cannot be electrically heated. Connections may also be in series, or series/parallel.

As diagrammatically shown in FIG. 7, power is supplied from a voltage source, e.g., battery 114, through leads 116 and 118 to opposite ends of the elongated leading edge portions 90 which are connected in parallel to the half shells 22 and 24, respectively, in FIG. 1. Any suitable power control system, such as that shown in commonly owned patent application Ser. No. 07/926,045 filed by Cornelison and Whittenberger, now U.S. Pat. No. 5,319,929 dated 14 Jun. 1994.

FIG. 8 is a cross-sectional view along the axis of a fully assembled converter body 10 showing the heated section and the "light-off" section contained in the same outer housing 32. Details of portions shown in FIG. 8 are shown on enlarged scale in FIGS. 6, 9 and 10. Otherwise, similar parts have like numbers.

FIG. 9 shows a detail of a rear mounting and sealing ring 54 indicated in FIG. 8:. The ring 54 has a circular notch 55 (see FIG. 2) dimensioned to accept the downstream end 58/60a of the inner retaining shell 50/52. In this embodiment the notch 55 is coated with "dielectric" coating and aids in insulating the core from the outer housing.

FIG. 10 shows another detail of a rear mounting and sealing ring 54 indicated in FIG. 8. Here the parts are all the same. The difference is that instead of the inside of the notch 55 being provided with a "dielectric" coating 56, the downstream end 58 of the inner retainer 50, which fits, as by a press fit, into the notch 55, is coated with a "dielectric" coating to electrically isolate the retainer 26, thereby preventing it from being grounded in use through the outer housing.

Figure 11:
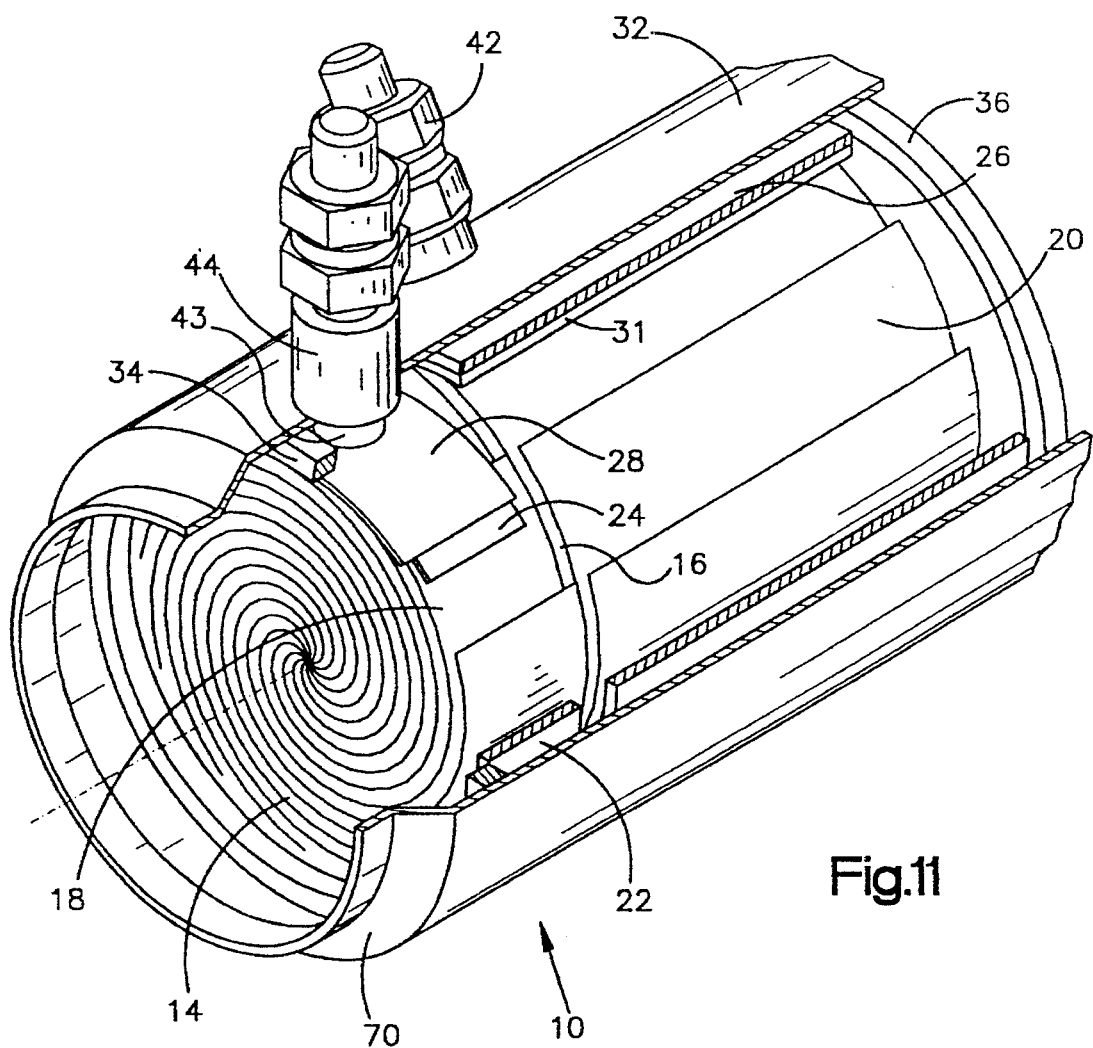
FIG. 11 is an isometric, partially cut-away view of a converter body in accordance with this invention.

FIG. 11 is a perspective, partially cut away view of a converter body in accordance with FIGS. 1 and 4 of this invention. The numbers and description correspond to the numbers and description in FIGS. 1 and 4 and thus need not be reproduced here.

Figure 12:
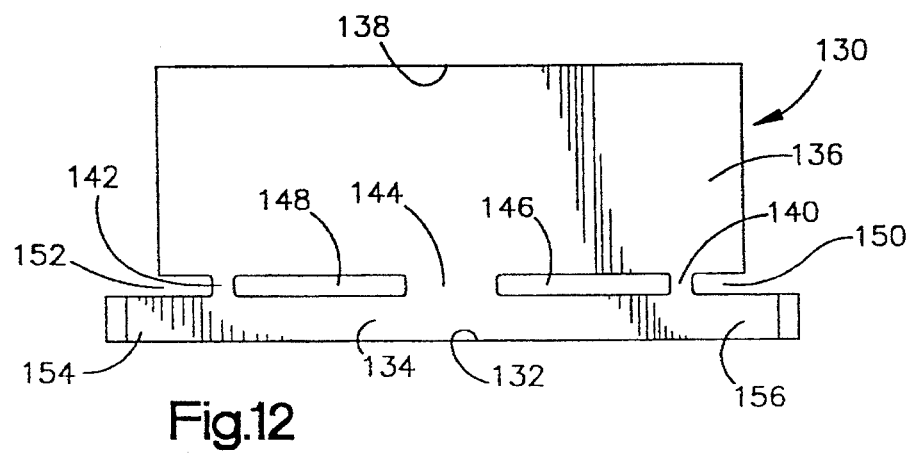
FIG. 12 is a developed view of a flat thin metal strip adapted to be attached to a power source for heating.

FIG. 12 is a development of another form of flat thin metal sheet. There is shown, therefore, a developed flat thin metal sheet 130 having an elongated leading edge 132 and leading edge portion 134. The leading edge portion 134 is separated from the trailing edge portion 136, having a trailing edge 138 parallel to the leading edge 132 by three bridge portions 140, 142 and 144 defined by enclosed notches 146 and 148, and open ended notches 150 and 152. The bridges and 142 aid with assembly and are burned out electrically after assembly to extend the notches 146 and 148 whereby the final flat thin metal strip assumes the shape and configuration of the thin metal strip 76 in FIG. 7. Note that the leading edge portion 134 is longer than the trailing edge portion 136.

Figure 13:
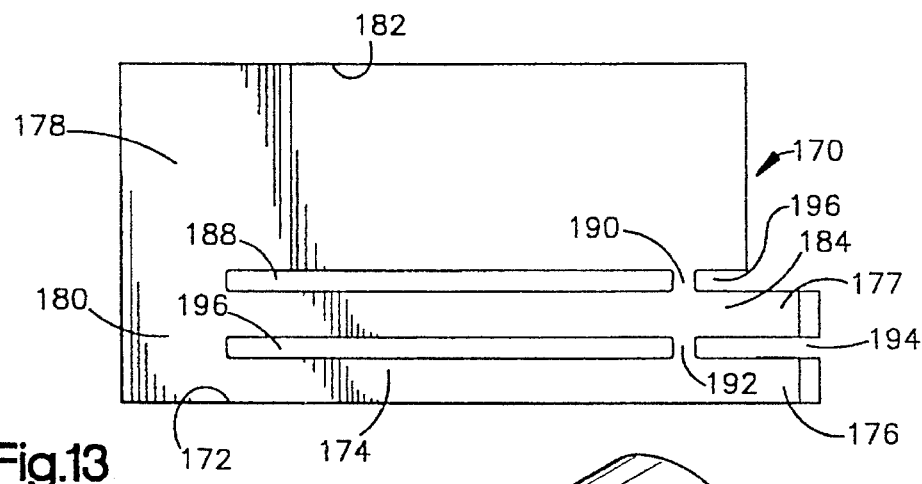
FIG. 13 is a developed view of another flat thin metal strip adapted to be attached to a power source for heating.

FIG. 13 is another development of a flat thin metal strip or sheet having an elongated leading edge in accordance herewith. There is here shown a developed flat thin metal sheet 170 having a leading edge 172 defining a leading edge portion 174 having a projecting end or distal end 176 adapted to be attached to one pole, e.g., the positive pole, of a voltage source, not shown. A bridge portion 180 connects the leading edge portion 174 at its left hand end, as shown, to a trailing edge portion 178 having a trailing edge 182. The bridge portion is wider in an axial direction than the bridge portion 144 in FIG. 12 to accommodate an intermediate extended portion 184. The portion 184 is defined by elongated closed notches 186 and 188, narrow removable bridges 190 and 192, and open notches 194 and 196. As indicated above, the bridges 190 and 192 are burned out electrically after assembly. The distal extremity of the intermediate extended portion 184 is adapted to be attached to the opposite pole, e.g., the negative pole, of a voltage source, not shown. This embodiment is a high voltage, high resistance device.

Figure 14:
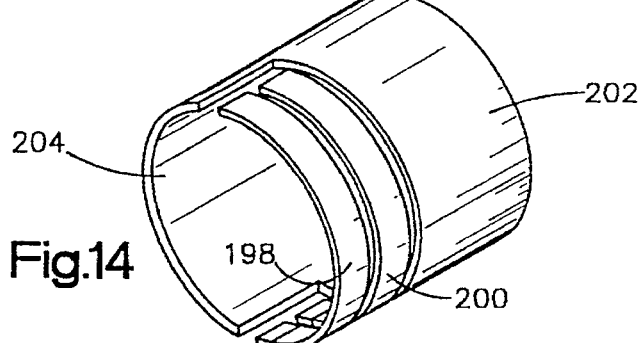
FIG. 14 is a diagrammatic isometric view of a core showing another type of split housing portion for attachment to positive and negative poles of a voltage source.

FIG. 14 shows in diagrammatic form the half shells 198 and 200 to which the distal ends 176 and 177 (FIG. 13) are attached, respectively, for indirect attachment in turn to the appropriate terminals of a voltage source, not shown. The inner housing 202 for the "light-off" section of the converter body is a 360 degree circular tubular member with a forward projecting semicircular portion 204. Only the half shells 198 and 200 are attached, respectively, to the positive and negative poles of a voltage source, not shown in FIG. 14, and to the ends of the projecting distal ends 176 and 177 (FIG. 13).

Figure 15:
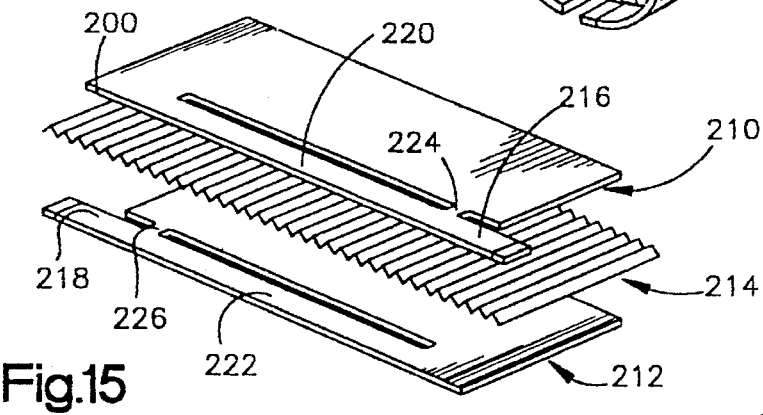
FIG. 15 is a developed view of a pair of flat thin metal strips with an interposed corrugated thin metal strip isometrically showing an arrangement where alternate flat thin metal strips are flipped over and the extended ends are adapted to be attached, respectively, to positive and negative poles of a voltage source (not shown) to provide a high voltage, high resistance device for rapid heating.
Figure 16:
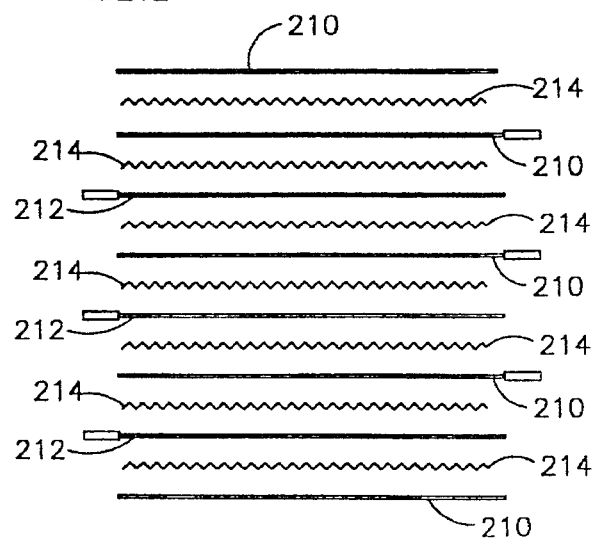
FIG. 16 is a diagrammatic end view of a series of thin metal sheets of the type Shown in FIG. 15 showing the extended tabs on one side adapted to be attached to ground, or negative pole, and the extended tabs on the other side adapted to be attached to the positive pole of a voltage source.
Figure 17:
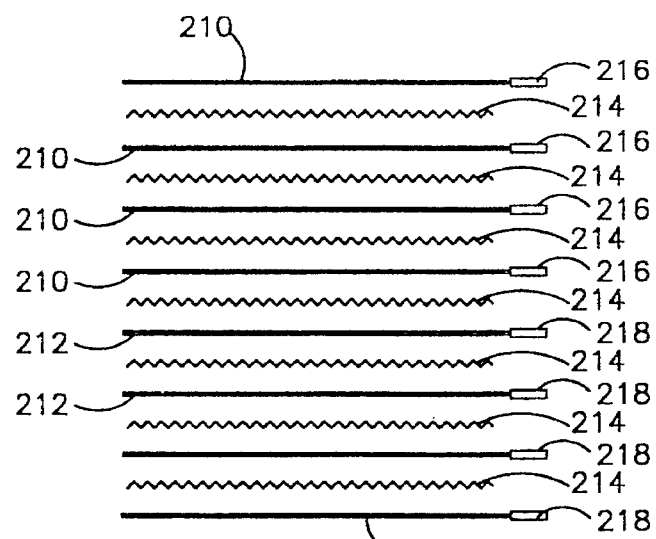
FIG. 17 is a diagrammatic end view of a series of thin metal sheets of the type shown in FIG. 15, with the tabs all extending in the same direction, but adapted to be attached to electrically isolated segments for connection to different poles of a voltage source.

FIGS. 15, 16 and 17 show in diagrammatic form another layering arrangement of the flat thin metal sheets and the corrugated thin metal sheets. There is shown in FIG. 15, a first flat thin metal sheet 210, a second flat thin metal sheet 212 and a corrugated thin metal sheet 214 disposed between the sheets 210 and 212. The projecting distal ends 216 and 218 of the leading edge portions 220 and 222 are oppositely directed by merely flipping one flat thin metal layer, e.g., layer 212, over with respect to the layer 210. A layering schematic is shown in FIG. 16 with numbers corresponding to those shown in FIG. 15. The narrow bridges 224 and 226 in FIG. 15 are electrically burned out after assembly into a core. The flat layers 210 the ends of the stack of FIG. 16 do not have distal ends 216 because only shorter layers 210 are required to prevent nesting of the corrugated layers 214 when the stack is rolled up to form the core body.

FIG. 17 shows an array of layered thin metal strips wherein all the projecting ends are aligned on the same side instead of being alternatively flipped as in FIG. 16. The ends 216 are adapted to be connected to a quarter shell 240 as diagrammatically and schematically shown in FIG. 18, and the ends 218 are adapted to be connected to a separate electrically isolated quarter shell 242 also as diagrammatically and schematically shown in FIG. 8, each of the quarter shells 240 and 242 being connected, in turn, indirectly to a voltage source, not shown. The circular tubular portion 244 enwraps the layers forming the "light-off" portion of the converter body, and has a forward extending semicircular portion 246 to enwrap the nonprojecting portions of the thin metal strips 210 and 214 (FIG. 17).

Figure 18:
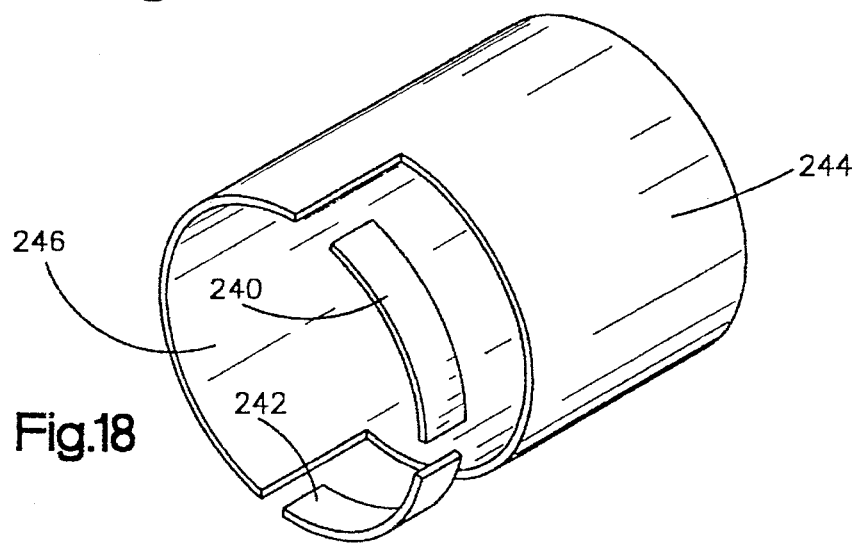
FIG. 18 is a diagrammatic isometric view showing a means of attaching the tabs shown in FIG. 17 to separated segments of the housing for the electrically heatable portion of the converter body.
Figure 19:
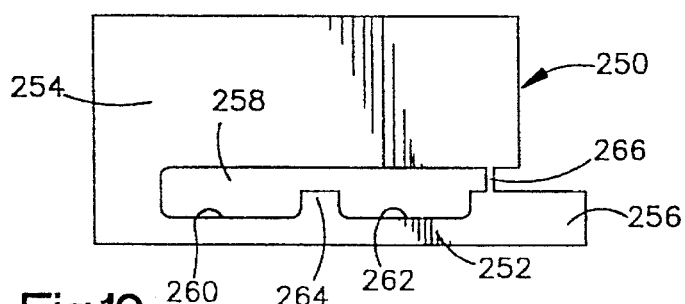
FIG. 19 is a developed plan view of a flat thin metal strip useful in the converter bodies hereof.

FIG. 19 shows a developed flat thin metal sheet or strip 250 having a leading edge portion 252 and a trailing edge portion 254 useful in the devices shown, for example in FIGS. 17 and 18. The leading edge portion 252 is elongated and has a laterally projecting tab 256 projecting to one side of the strip 250 rather than projecting equally on both sides of the strip 250. The leading edge portion 252 is separated in part from the trailing edge portion 254 by a configured elongated closed end slot 258. The slot 258 has a pair of spaced notches 260 and 262 separated by an intermediate axially projecting tab 264. The laterally projecting tab 256 is connected by a narrow removable bridge 266 to aid in assembly and which is electrically removed thereafter. The spaced notches 260 and 262 define zones of greater heating than will occur in the portions 264 and 256.

Figure 20:
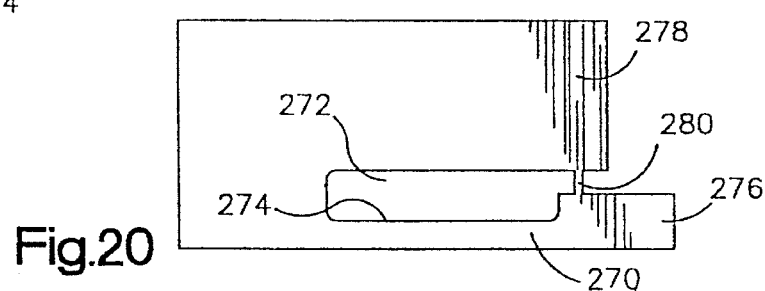
FIG. 20 is a developed plan view of another flat thin metal strip useful in the converter bodies hereof.

FIG. 20 shows a developed flat thin metal sheet of different form useful in the manners shown in FIGS. 16 and 17, for example, but having a configured leading edge portion 270. The leading edge portion 270 is defined by a slot 272 having an axially extending notch 274 therein. The leading edge portion 270 projects to one side to define a laterally projecting tab or distal end 276. The laterally projecting tab 276 is connected to the trailing edge portion 278 by a narrow removable bridge 280. This form also provides for localized heating.

Figure 21:
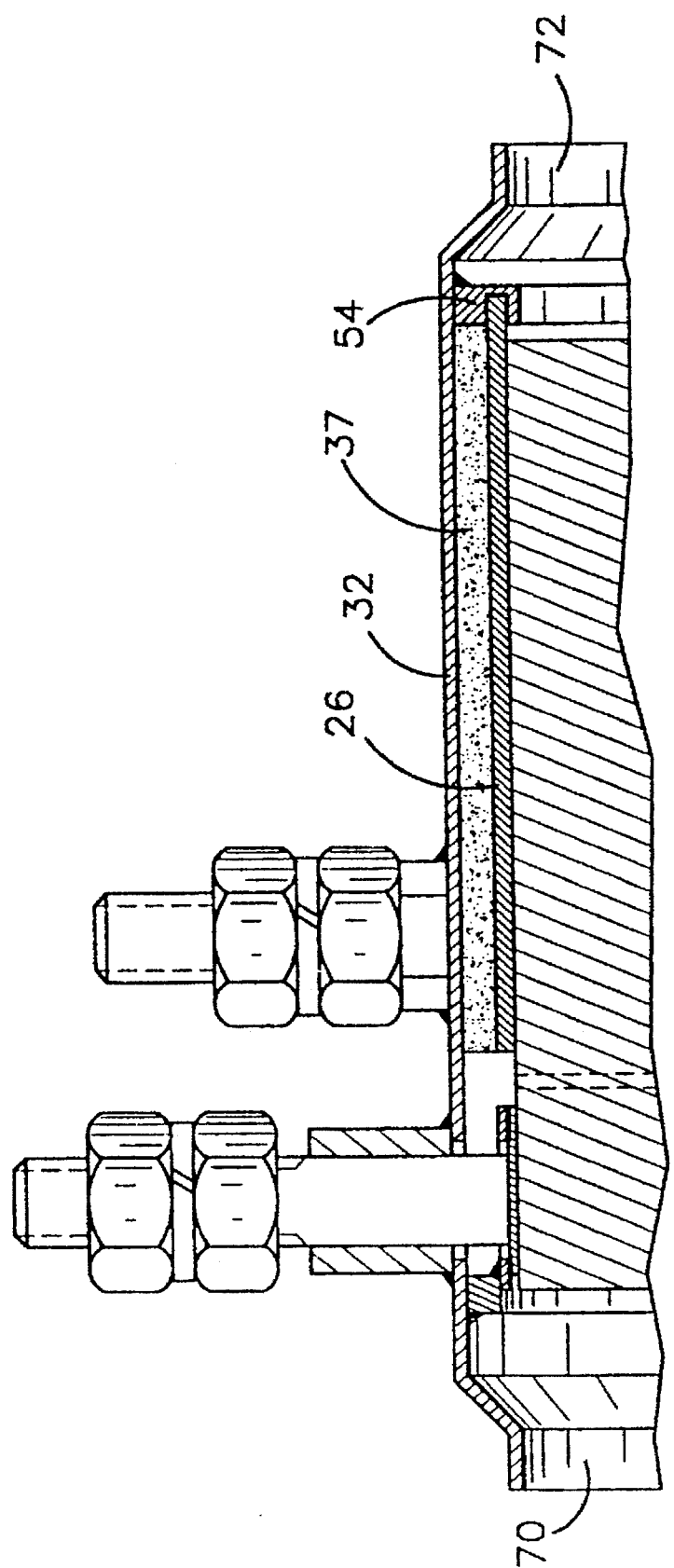
FIG. 21 is a fragmentary view in axial cross-section showing another form of insulating between the inner and outer housing.

FIG. 21 is a fragmentary view in axial cross-section from FIG. 8 showing another form of insulating between the inner housing 26 and the outer housing 32. Here a fibrous ceramic mat insulation 37, such as INTERAM discussed above, is used to provide insulation between the inner housing 26 and the outer housing 32.

There has thus been provided an electrically heatable converter body including a multicellular metallic honeycomb characterized by a plurality of first thin metal strips and a plurality of second thin metal strips in layered alternating relation, and wherein the first thin metal strips have a leading edge portion and a trailing edge portion, the leading edge portion of the first thin metal strips being longer than the trailing edge of said first thin metal strips.

What is claimed is:

1. A combined metallic electrically heatable and "light-off" converter body including a multicellular metallic honeycomb, said honeycomb comprising a plurality of first thin metal layers and a plurality of second thin metal layers each of said first and second thin metal layers having a leading edge and a trailing edge with respect to fluid flowing transversely thereover, said first and second layers being in alternating relation, each of said first metal layers having a leading edge portion including said leading edge and having a width, and a trailing edge portion including said trailing edge and having width, the leading edge portions of said first thin metal layers being longer than the trailing edge portions of said first thin metal layers.

2. A converter body as defined in claim 1 wherein each of the second thin metal layers has a leading edge portion including said leading edge, and a trailing edge portion including said trailing edge, and the leading edge portions of said second thin metal layers being shorter than the trailing edge portions of said first thin metal layers.

3. A converter body as defined in claim 1 wherein the first thin metal layers are flat thin metal layers.

4. A converter body as defined in claim 1 wherein the second thin metal layers are corrugated thin metal layers.

5. A converter body as defined in claim 3 wherein the flat thin metal layers have approximately an H-shape.

6. A converter body as defined in claim 5 wherein the flat thin metal layers each have opposite ends and a transverse centerline, and each have a pair of oppositely inwardly directed notches extending inwardly from the opposite ends toward said centerline.

7. A converter body as defined in claim 6 wherein the notches extend parallel to the leading edge.

8. A converter body as defined in claim 3 wherein the flat thin metal layers have a coating of refractory metal oxide on at least one side thereof.

9. A converter body as defined in claim 8 wherein the coating of refractory metal oxide is a "dielectric" coating.

10. A converter body as defined in claim 8 wherein the refractory metal oxide comprises alumina.

11. A converter body as defined in claim 10 wherein the coating comprises gamma-alumina.

12. A converter body as defined in claim 8 wherein the coating also has a catalyst supported thereon.

13. A converter body as defined in claim 12 wherein the catalyst is a noble metal catalyst.

14. A converter body as defined in claim 13 wherein the noble metal catalyst is selected from the group consisting of platinum, palladium, rhodium, ruthenium, and mixtures of at least two of such metals.

15. A converter body as defined in claim 1 further including a sheet metal tubular housing for at least a portion of said honeycomb, said tubular housing having an axis and said tubular housing being divided in a direction parallel to the axis of said tubular housing into a plurality of electrically isolated segments.

16. A converter body as defined in claim 15 wherein the tubular housing is divided into a pair of electrically isolated segments.

17. A converter body as defined in claim 16 wherein one of said electrically isolated segments is connected to one pole of a voltage source, and the other electrically isolated segment is connected to the other pole of the voltage source.

18. A converter body as defined in claim 15 wherein the leading edge portions of said first thin metal layers have distal extremities and wherein said distal extremities are conductively attached one to each of said electrically isolated segments.

19. A converter body as defined in claim 15 wherein said electrically isolated segments are a pair of approximately semicircular metal segments having a width approximately equal to the width of said leading edge portions and surrounding said leading edge portions.

20. A converter body as defined in claim 19 wherein the leading edge portions of said first thin metal layers have distal extremities and wherein said distal extremities are conductively attached to said approximately semicircular segments.

21. A converter body as defined in claim 19 further including a single semicircular metal half shell having an inner surface, and having a "dielectric" coating on said inner surface thereof, and said single semicircular metal half shell being superimposed on one of said approximately semicircular metal segments.

22. A converter body, as defined in claim 1 including an electrically heatable portion formed from said leading edge portions of said first layers and a "light-off" portion formed of the trailing edge portions of said first and second layers in integral relation and said electrically heatable portion and said "light-off" portion being contained in an inner housing.

23. A converter body as defined in claim 22 wherein said inner housing is formed from an inner split ring retainer for enclosing the electrically heatable portion and an inner tubular retainer for enclosing said "light-off" portion.

24. A converter body as defined in claim 23 further including a single outer housing and means disposed between said inner housing and said single outer housing for mounting and sealing said inner housing in said outer housing.

25. A converter body as defined in claim 24 further including end cap adaptors to enable attachment of the converter body to an exhaust line.

26. A converter core element comprising a thin metal layer having a leading edge portion for connection to a voltage source including a leading edge, and a trailing edge portion which is not substantially electrically heatable, said leading edge portion * being longer than the trailing edge portion, and said leading edge portion being separated from said trailing edge portion by at least one laterally extending notch and said leading edge portion being connected to the trailing edge portion by at least one bridge spanning said at least one laterally extending notch, wherein said bridge closes at least one inner end of said at least one laterally extending notch.

27. A converter core element as defined in claim 26 wherein the thin metal layer is flat.

28. A converter core element as defined in claim 27 wherein said leading edge portion is connected to said trailing edge portion by at least one additional bridge portion.

29. A converter core element as defined in claim 27 wherein said at least one bridge is centrally located.

30. A converter core element as defined in claim 28 wherein said at least one bridge is located toward one end of said flat thin metal layer and bridges said at least one laterally extending notch, and said at least one additional bridge portion is centrally located and bridges said at least one laterally extending notch.

31. A converter core element comprising a thin metal layer having an electrically heatable leading edge portion including a leading edge; a trailing edge portion which is not substantially electrically heatable, said leading edge portion being longer than the trailing edge portion; and an electrically heatable intermediate leading edge portion located between said first leading edge portion and said trailing edge portion, said first leading edge portion being separated from said intermediate leading edge portion by a first laterally extending notch, and said intermediate leading edge portion being separated from said trailing edge portion by a second laterally extending notch parallel to said first laterally extending notch, and said at least one bridge spanning said first notch between said leading edge portion and said intermediate leading edge portion, and at least one bridge spanning said second laterally extending notch between said intermediate leading edge portion and said trailing edge portion.

* * * * *